(No Model.)

G. D. SPOONER.
MUZZLE FOR ANIMALS.

No. 368,430. Patented Aug. 16, 1887.

Witnesses:
J. T. Theo. Lang.
Robt. L. Fenwick.

Inventor:
George D. Spooner
by his atty's
Mason, Fenwick & Lawrence

UNITED STATES PATENT OFFICE.

GEORGE D. SPOONER, OF RUTLAND, VERMONT.

MUZZLE FOR ANIMALS.

SPECIFICATION forming part of Letters Patent No. 368,430, dated August 16, 1887.

Application filed May 27, 1887. Serial No. 239,547. (No model.)

*To all whom it may concern:*

Be it known that I, GEORGE D. SPOONER, a citizen of the United States, residing at Rutland, in the county of Rutland and State of Vermont, have invented certain new and useful Improvements in Muzzles for Animals; and I do hereby declare the following to be a full, clear, and exact description of the invention, such as will enable others skilled in the art to which it appertains to make and use the same.

Figure 1:
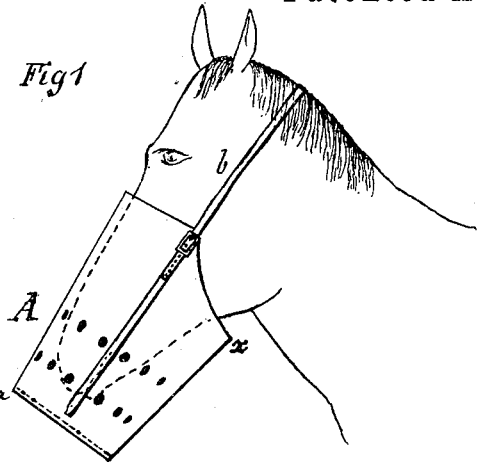
Figure 2:
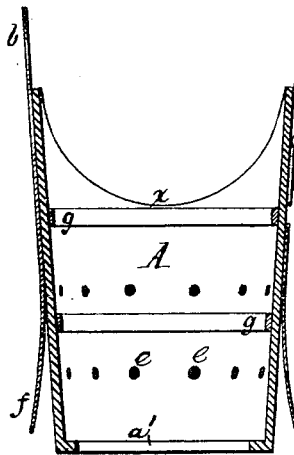
Figure 3:
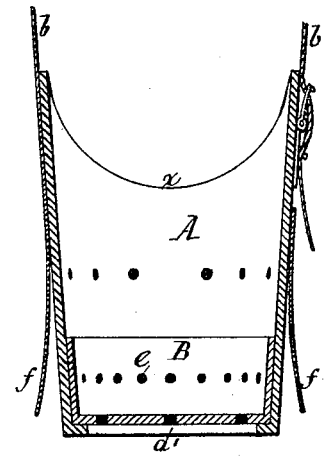
Figure 4:
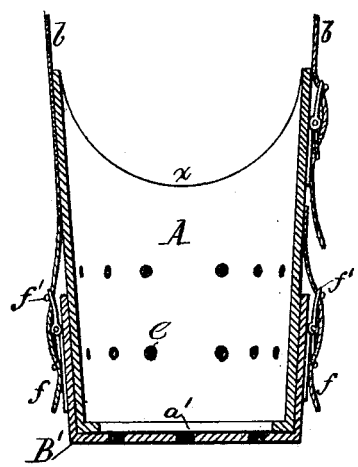
Figure 5:
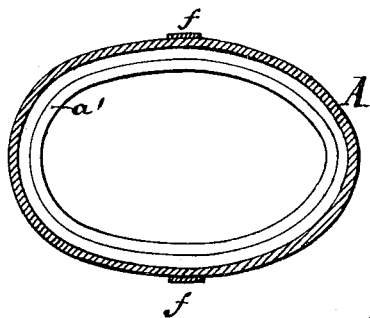

In the accompanying drawings, Figure 1 is a side view showing my improved muzzle in use. Fig. 2 is a vertical central cross-section of the same removed from the horse's head. Fig. 3 is a like section showing an inside removable bottom-closing portion which serves for converting my improved open muzzle into a closed muzzle. Fig. 4 is a like view showing the inner bottom-closing portion removed and an outer one applied in lieu thereof, and Fig. 5 is a horizontal section showing the general contour of my improved muzzle.

The object of my invention is the production of a muzzle for different kinds of animals, but more particularly for horses addicted to the habit of biting, nipping, pulling off and chewing their blankets, and licking their sores and the sides of their stalls, &c., and which, while the same is especially adapted to be used as an open muzzle, which allows the animal to feed either in the stall or in the field, can readily be changed into a closed muzzle, and which without removal of parts will afford ventilation to the animal and prevent him from eating, but not interfere with his drinking.

As shown in Fig. 1, the muzzle A, when in use, is held suspended from the horse's head by a strap, *b*, as shown, so as to allow the bottom edge, *a*, of the muzzle to extend about three inches below the nose of the animal, and thus when the animal, whether in the stall or turned out in the field to graze, attempts to feed such act will force the muzzle upward on his face and so freely allow the horse to feed; but the moment the animal ceases to eat and raises his head the muzzle will move downward to its normal position, with the open end *a* extending below the horse's nose, as stated. In this condition, if the horse turns his head toward either his right or left side and attempts to pull off or nip at his blanket, or if he turns his head sidewise while in his stall for either of the vicious purposes named, the edge *a* of the muzzle cannot be raised up on the face of the horse, and therefore will strike the object aimed at in such manner as to prevent the use either of the teeth or the tongue of the animal for such named purpose.

In the present instance I utilize leather from which to construct the muzzle, which, at its bottom on the inside, has a band or ledge, *a'*, all around its lower open end, the ledge being sewed in position, and serving not only to strengthen and maintain the form of the muzzle at its lower end, but also to sustain and hold in place an inside closing bottom, B, as shown in Fig. 3, and which, when used, converts the open-end muzzle A into a closed muzzle, under which latter condition the horse is prevented from eating, while at the same time such "closed muzzle" will admit of ventilation, as well as watering the animal, through the perforations *e*, which are common to both the muzzle A and said bottoms. The band *a'* may be of metal or other material and properly fastened in place.

As shown in Fig. 4, the inside bottom is removed and an outside bottom portion, B', applied instead, the latter being held in place by straps *f* on either side of the muzzle and buckles *f'* on either side of the bottom portion, B', provision thus being made for the supply of a clean or fresh bottom piece in lieu of the one or the other which may have been removed in order to be cleansed. Either of these bottoms may be used in connection with the muzzle A, as occasion may require, the one in lieu of the other, either of them, when used, subserving the purpose of converting the "open muzzle" A into a closed muzzle, and both preventing the animal from eating, but permitting watering, as well as affording ventilation.

The straps *f f* are provided with a series of buckle-tongue holes, so that the tongues of the buckles may be passed through holes at different altitudes, and thus the bottom portion be suspended at any desired distance below the horse's mouth or lips. The construction illustrated in Fig. 4 is a preferable one, as it is readily adjusted to the length of the horse's head or the necessities of the case; but while this is so, the construction shown in Fig. 3 is useful, because its bottom portion, same as the bottom portion shown in Fig. 4, is attached only temporarily, and can be quickly removed by the hands without the aid of cutting or ripping tools.

The contour of the muzzle A being of oblong form in horizontal section, as shown, with the breadth greatest in front and gradually conforming to the lesser breadth of the head of the horse in the rear, and also cut away at $x$ to conform to the throat of the horse, may be preserved by bands, as $g$ $g$, of any proper material applied to the inside of the muzzle, as shown, and in this manner I maintain the general desirable adaptations of the muzzle to that part of the body of the animal on which it is to be used, and which, being preserved, admits of its use without discomfort to the animal. In this instance I have preferably constructed my improved muzzle of leather, formed and perforated as shown, and with its lower end open, thus admitting of its being shoved up along the head of the animal while feeding at his manger, and so as to allow the lips of the animal to project below its lower end, if need be, when grazing, but preventing such projecting of the lips and mouth when attempting to bite sidewise, either to the right or left, or to bite his body, upon which sores may be in the act of healing.

It is apparent that when the invention is used as a closed muzzle the proportions may be made such as to admit of feed being placed within it for the use of the animal, and thus subserve a twofold purpose—a muzzle and a feed-box—and it will be understood that my improved muzzle, as described, may be made of wire, flexible metal, or any other suitable material besides leather.

I am aware that a feed-bag has been constructed with a bottom which, when worn out, can be removed and its place supplied by a new bottom; but this is not a muzzle which is readily convertible from an open to a closed muzzle, and vice versa, and I make no claim to such bag.

I also am aware that a muzzle has been constructed with a permanently-fixed bottom, which, when requiring to be renewed, is removable by the aid of tools; but neither this construction nor the mode of fastening the bottom in position can be regarded as ever contemplating the use of the muzzle as a convertible bottomless muzzle and a muzzle with a bottom. It is, in fact, only a muzzle which is intended always to be used with its bottom in place. I make no claim to any such muzzle.

I also am aware that a muzzle which is not constructed to extend beyond the horse's mouth or lips has had combined with it sticking points or pricking devices which prick the sides of the horse's mouth whenever he attemps to move his mouth sidewise for the purpose of biting upon his stall or other vicious purpose, and I make no claim for any such muzzle as just mentioned.

I also am aware that a lengthening and shortening muzzle has been constructed, so that one part slides upon the other, and thereby allows the animal to feed while his head is moved downward on a vertical plane with his longitudinal median line, but prevents him biting sidewise. This invention bears a resemblance to mine; but I have made the discovery that it is not necessary to resort to the expensive mode of constructing the muzzle in two separate portions, one arranged to slide upon the other, and that it is only necessary to make the muzzle open at its bottom and with an extension on its bottom end beyond the lips of the animal of a few inches, and that with this construction the animal will be prevented from biting sidewise, while he is permitted to freely eat when he moves his head downward in the plane of the median line of his body, under which action of his head the muzzle, by reason of its construction and arrangement, rises bodily upon the face of the animal and does not interfere with his feeding. I make no claim to a bottomless muzzle which is made of two body portions one of which slides upon the other.

I also am aware that a muzzle has been constructed with a hinged or pivoted self closing and opening bottom plate, for the purpose of allowing an animal to feed when his head is lowered, and prevents him eating or sucking when his head is raised. I make no claim to such contrivance.

What I claim as my invention is—

1. The muzzle having its body portion in one section, made open at its lower end, provided with suspending and confining straps, as $b$, cut away at $x$ to fit an animal's throat, shaped to fit the animal's face, arranged to slip bodily up and down a short distance, and having its open end, when in its normal position on the animal, extended a proper distance below the animal's mouth or lips, substantially as and for the purpose described.

2. The temporarily-attachable perforated bottom portion provided with buckles, in combination with the muzzle A, having its body of one section made open at its lower end, perforated around said end, provided with suspending and confining straps, as $b$, cut away at $x$ to fit an animal's throat, shaped to fit the animal's face, arranged to slip bodily up and down a short distance, and having its open end, when in its normal position on the animal, extended a short distance below the animal's mouth or lips, substantially as and for the purpose described.

In testimony whereof I affix my signature in presence of two witnesses.

GEORGE D. SPOONER.

Witnesses:
 FRED M. BUTLER,
 NEWMAN WEEKS.